US012696224B2

(12) United States Patent
Ren et al.

(10) Patent No.: US 12,696,224 B2
(45) Date of Patent: Jul. 28, 2026

(54) SIGNAL PROCESSING METHOD, AND APPARATUS

(71) Applicant: DATANG MOBILE COMMUNICATIONS EQUIPMENT CO., LTD., Beijing (CN)

(72) Inventors: Bin Ren, Beijing (CN); Ren Da, Beijing (CN); Rongyi Fang, Beijing (CN); Zhenyu Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 387 days.

(21) Appl. No.: 18/261,269

(22) PCT Filed: Jan. 17, 2022

(86) PCT No.: PCT/CN2022/072307
§ 371 (c)(1),
(2) Date: Jul. 13, 2023

(87) PCT Pub. No.: WO2022/152291
PCT Pub. Date: Jul. 21, 2022

(65) Prior Publication Data
US 2024/0073852 A1      Feb. 29, 2024

(30) Foreign Application Priority Data

Jan. 18, 2021    (CN) .......................... 202110059901.8

(51) Int. Cl.
H04W 64/00          (2009.01)
H04L 5/00           (2006.01)
(52) U.S. Cl.
CPC ........... H04W 64/00 (2013.01); H04L 5/0051 (2013.01)

(58) Field of Classification Search
CPC .. H04W 64/00; H04W 56/005; H04L 5/0051; H04L 25/022; G01S 5/021; G01S 5/0205
See application file for complete search history.

(56) References Cited

U.S. PATENT DOCUMENTS 7,907,909 B2     3/2011   Yu
10,623,121 B1 *  4/2020   Satrasala ............... H04W 24/08
(Continued)

FOREIGN PATENT DOCUMENTS

CN       1589536 A     3/2005
CN       103209475 A   7/2013
(Continued)

OTHER PUBLICATIONS

Rafal Hibner et al. , "Frequency Dependent Mismatch Correction Scheme for Zero-IF Receivers" , International Journal of Electronics and Telecommunications , 2018, vol. 64, No. 1, pp. 13-18.
CATT, "Discussion of NR positioning enhancements", 3GPP TSG RAN WG1 Meeting #103-e, e-Meeting, Oct. 26-Nov. 13, 2020, total 23 pages, R1-2007860.

*Primary Examiner* — Dhaval V Patel
(74) *Attorney, Agent, or Firm* — KILPATRICK TOWNSEND & STOCKTON LLP

(57) ABSTRACT
Disclosed are a signal processing method and an apparatus The signal processing method provided in the present application includes: performing channel estimation processing on the basis of a received positioning reference signal (PRS), to obtain a frequency domain channel response; determining a difference value of a relative group delay of a sub-band on the basis of the frequency domain channel response; and compensating, on the basis of the difference value of the relative group delay of the sub-band, a locally received PRS or the frequency domain channel response; or reporting the difference value of the relative group delay of the sub-band to a transmitting end, and compensating a transmission signal by means of the transmitting end.

20 Claims, 5 Drawing Sheets

(56)    References Cited

U.S. PATENT DOCUMENTS

| | | | |
|---|---|---|---|
| 11,206,631 B2 * | 12/2021 | Kim | H04B 7/0682 |
| 2012/0243648 A1 | 9/2012 | Currivan et al. | |
| 2012/0250493 A1 | 10/2012 | Liao et al. | |
| 2013/0162470 A1 * | 6/2013 | Rousu | G01S 5/021 |
| | | | 342/450 |
| 2016/0211898 A1 * | 7/2016 | Cai | H04B 7/0617 |
| 2016/0381504 A1 | 12/2016 | Sommer | |
| 2020/0153517 A1 | 5/2020 | Akkarakaran et al. | |
| 2020/0205104 A1 * | 6/2020 | Akkarakaran | H04W 8/24 |
| 2021/0119746 A1 * | 4/2021 | Manolakos | G01S 5/10 |
| 2021/0181293 A1 * | 6/2021 | Chae | H04W 64/00 |
| 2022/0015051 A1 * | 1/2022 | Duan | H04W 56/004 |
| 2022/0053435 A1 * | 2/2022 | King | H04W 56/0005 |

FOREIGN PATENT DOCUMENTS

| | | | |
|---|---|---|---|
| CN | 106664268 A | 5/2017 | |
| CN | 110351165 A | 10/2019 | |
| CN | 111435887 A | 7/2020 | |
| CN | 111435910 A | 7/2020 | |
| EP | 1515147 A1 | 3/2005 | |
| JP | 2005039396 A | 2/2005 | |
| WO | 2007131056 A2 | 11/2007 | |
| WO | WO-2019083345 A1 * | 5/2019 | G01S 5/10 |
| WO | 2020220803 A1 | 11/2020 | |
| WO | 2020223460 A1 | 11/2020 | |

* cited by examiner

Transmitting PRS configuration information to a terminal ⟶ S301

Receiving a DL RSTD measurement quantity reported by the terminal, and determining a position of the terminal base on known position information of a base station ⟶ S302

Memory — 11

Processor — 12

SIGNAL PROCESSING METHOD, AND APPARATUS

CROSS-REFERENCE TO RELATED APPLICATIONS

The present application is a National Stage of International Application No. PCT/CN2022/072307, filed Jan. 17, 2022, which claims priority to Chinese Patent Application No. 202110059901.8, filed with the China National Intellectual Property Administration on Jan. 18, 2021 and entitled "Signal Processing Method and Apparatus", which is hereby incorporated by reference in its entirety.

FIELD

The present application relates to the field of communication technologies, and particularly to a signal processing method and apparatus.

BACKGROUND

The delay of the transmission channel between a terminal UE and a base station may bring a measurement errors to the time-related positioning measurement values (such as Downlink Reference Signal Time Difference (DL RSTD), Uplink Relative Time Of Arrival (UL RTOA), receiving-transmitting (Rx-Tx) time difference on the terminal (UE) side, and Rx-Tx time difference on the base station (gNB) side). In the user terminal positioning system of wireless communication, in order to satisfy the sub-meter positioning accuracy, the relative group delay is one of the key issues that directly affect the positioning performance.

Currently, there is no available relative group delay measurement and signal compensation method with high accuracy. If the relative group delay is not processed, the relative group delay will directly affect the accuracy of Time Of Arrival (TOA) estimation and thus affect the final UE positioning accuracy.

SUMMARY

Embodiments of the present application provide a signal processing method and apparatus, to implement the signal compensation based on the relative group delay, improve the accuracy of TOA estimation, and thus ultimately improve the UE positioning accuracy.

At the signal receiving terminal, a signal processing method provided by an embodiment of the present application includes:

performing channel estimation processing based on a received Positioning Reference Signal (PRS) to obtain a frequency domain channel response;

determining a differential value of a relative group delay of a subband based on the frequency domain channel response;

compensating a locally received PRS signal or the frequency domain channel response based on the differential value of the relative group delay of the subband; or reporting the differential value of the relative group delay of the subband to a transmission terminal, where the differential value of the relative group delay of the subband is adopted to compensate a transmission signal.

In this method, the channel estimation processing is performed based on the received PRS to obtain the frequency domain channel response; the differential value of the relative group delay of the subband is determined based on the frequency domain channel response; the locally received PRS signal or the frequency domain channel response is compensated based on the differential value of the relative group delay of the subband; or the differential value of the relative group delay of the subband is reported to the transmission terminal that compensates the transmission signal, so as to improve the accuracy of TOA estimation by compensating the relative group delay within the full bandwidth, and thus ultimately improve the UE positioning accuracy.

In some embodiments, when the locally received PRS signal or the frequency domain channel response is compensated, the method further includes:

performing TOA measurement based on a compensated PRS signal or a compensated frequency domain channel response, to obtain a TOA measurement and a DL RSTD measurement.

In some embodiments, the method further includes:

reporting the DL RSTD measurement to a Location Management Function (LMF) entity.

In some embodiments, the DL RSTD measurement is a DL RSTD measurement after performing single differential processing on the TOA measurement.

In some embodiments, determining the differential value of the relative group delay of the subband based on the frequency domain channel response, specifically includes:

determining a reference subband R, and a total delay $\tau_{Total,sub}(R)$ on the reference subband R;

determining a total delay $\tau_{Total,sub}(N)$ on an $N^{th}$ ($N{\neq}R$) subband;

determining a differential value $\Delta\tau_{delay,sub,diff}(N)$ of a relative group delay on the $N^{th}$ subband based on the total delay $\tau_{Total,sub}(R)$ on the reference subband R and the total delay $\tau_{Total,sub}(N)$ on the $N^{th}$ subband.

In some embodiments, the total delay $\tau_{Total,sub}(R)$ on the reference subband R is determined by a following formula:

$$\tau_{Total,sub}(R)=\text{phase}(H(k_2)^*\text{conj}(H(k_1)))/(-2\pi(k_1-k_2))$$
$$\Delta f_{scs})=\tau_{LOS}+\Delta t+\Delta\tau_{delay,sub}(R);$$

where $k_2$ and $k_1$ represent any two subcarrier indices on the reference subband R ($k_1{<}k_2$), $\Delta f_{scs}$ represents a subcarrier spacing; $H(k_1)$ represents a frequency domain channel response on a $k_1^{th}$ subcarrier, $H(k_2)$ represents a frequency domain channel response on a $k_2^{th}$ subcarrier; $\tau_{LOS}$ represents a transmission delay of a Line Of Sight (LOS) path; $\Delta t$ represents a cumulative sum of clock offsets between the transmission terminal and a receiving terminal; and $\Delta\tau_{delay,sub}(R)$ represents a relative group delay on an $R^{th}$ reference subband;

the total delay $\tau_{Total,sub}(N)$ on the $N^{th}$ subband is determined by a following formula:

$$\tau_{Total,sub}(N)=\text{phase}(H(k_4)^*\text{conj}(H(k_3)))/(-2\pi(k_4-k_3))$$
$$\Delta f_{scs})=\tau_{LOS}+\Delta t+\Delta\tau_{delay,sub}(N);$$

where $k_4$ and $k_3$ represent any two subcarrier indices on the $N^{th}$ subband ($k_3{<}k_4$), $H(k_3)$ represents a frequency domain channel response on a $k_3^{th}$ subcarrier, $H(k_4)$ represents a frequency domain channel response on a $k_4^{th}$ subcarrier, and $\Delta\tau_{delay,sub}(N)$ represents the relative group delay on the $N^{th}$ subband;

the differential value $\Delta\tau_{delay,sub,diff}(N)$ of the relative group delay on the $N^{th}$ subband is determined by a following formula:

$$\Delta\tau_{delay,sub,diff}(N)=\tau_{Total,sub}(N)-\tau_{Total,sub}(R)=\Delta\tau_{delay,sub}(N)-\Delta\tau_{delay,sub}(R).$$

In some embodiments, when the local received signal or the frequency domain channel response is compensated, the compensated frequency domain channel response H'(k) is obtained by a following formula:

$$H'(k) = H(k)e^{j2\pi*k*\Delta f_{scs}*\Delta\tau_{delay,sub,diff}\left(floor\left(\frac{k-1}{Q}\right)+1\right)}, k = 1 \ldots (M*Q);$$

where a system bandwidth is divided into M subbands, each subband contains Q subcarriers, H(k) represents an uncompensated frequency domain channel response, $\Delta f_{scs}$ represents a subcarrier spacing, $$N = \text{floor}\left(\frac{k-1}{Q}\right) + 1,$$

and N represents an index value of a subband.

In some embodiments, the reporting the differential value of the relative group delay of the subband to the transmission terminal, specifically includes:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

At the signal transmission terminal, a signal processing method provided by an embodiment of the present application includes:

receiving a differential value of a relative group delay of a subband;

compensating a transmission signal based on the differential value of the relative group delay of the subband.

In some embodiments, the transmission signal in frequency domain is compensated by a following formula:

$$X'(k) = X(k)e^{j2\pi*k*\Delta f_{scs}\left(\Delta\tau_{delay,sub,diff}\left(floor\left(\frac{k-1}{Q}\right)+1\right)\right)};$$

where X(k) represents a data symbol before compensation to be transmitted on a $k^{th}$ subcarrier, X'(k) represents a data symbol after compensation to be transmitted on the $k^{th}$ subcarrier, $\Delta f_{scs}$ represents a subcarrier spacing, $$N = \text{floor}\left(\frac{k-1}{Q}\right) + 1,$$

N represents an index value of a subband, and $\Delta\tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of subcarriers.

In some embodiments, the method further includes:

mapping a compensated transmission signal X'(k) to the $k^{th}$ subcarrier for transmission.

On the Location Management Function, LMF side, a signal processing method provided by an embodiment of the present application includes:

transmitting PRS configuration information to a terminal;

receiving a DL RSTD measurement reported by the terminal, and determining a position of the terminal base on known position information of base stations.

In some embodiments, the PRS configuration information includes at least one of:

a frequency domain location of a same Component Carrier (CC) or frequency domain locations of different CCs;

time domain location information of PRS;

frequency domain location information of PRS; or a notification that a transmission terminal or receiving terminal compensates a transmitted signal.

At the signal receiving terminal, a signal processing apparatus provided by an embodiment of the present application includes:

a memory configured to store program instructions;

a processor configured to invoke the program instructions stored in the memory and execute according to an obtained program:

performing channel estimation processing based on a received PRS to obtain a frequency domain channel response;

determining a differential value of a relative group delay of a subband based on the frequency domain channel response;

compensating a locally received PRS signal or the frequency domain channel response based on the differential value of the relative group delay of the subband; or reporting the differential value of the relative group delay of the subband to a transmission termina, where the differential value of the relative group delay of the subband is adopted to compensate a transmission signal.

In some embodiments, when the locally received PRS signal or the frequency domain channel response is compensated, the processor is further configured to:

perform TOA measurement based on a compensated PRS signal or a compensated frequency domain channel response, to obtain a TOA measurement and a DL RSTD measurement.

In some embodiments, the processor is further configured to:

report the DL RSTD measurement to an LMF entity.

In some embodiments, the DL RSTD measurement is a DL RSTD measurement after performing single differential processing on the TOA measurement.

In some embodiments, the determining the differential value of the relative group delay of the subband based on the frequency domain channel response, specifically includes:

determining a reference subband R, and a total delay $\tau_{Total,sub}(R)$ on the reference subband R;

determining a total delay $\tau_{Total,sub}(N)$ on an $N^{th}$ (NR) subband;

determining a differential value $\Delta\tau_{delay,sub,diff}(N)$ of a relative group delay on the $N^{th}$ subband based on the total delay $\tau_{Total,sub}(R)$ on the reference subband R and the total delay $\tau_{Total,sub}(N)$ on the $N^{th}$ subband.

In some embodiments, the total delay $\tau_{Total,sub}(R)$ on the reference subband R is determined by a following formula:

$$\tau_{Total,sub}(R)=\text{phase}(H(k_2)*\text{conj}(H(k_1)))/(-2\pi(k_2-k_1))$$
$$\Delta f_{scs})=\tau_{LOS}+\Delta t+\Delta\tau_{delay,sub}(R);$$

where $k_2$ and $k_1$ represent any two subcarrier indices on the reference subband R ($k_1 < k_2$), $\Delta f_{scs}$ represents a subcarrier spacing; $H(k_1)$ represents a frequency domain channel response on a $k_1{}^{th}$ subcarrier, $H(k_2)$ represents a frequency domain channel response on a $k_2{}^{th}$ subcarrier; $\tau_{LOS}$ represents a transmission delay of an LOS path; $\Delta t$ represents a cumulative sum of clock offsets between the transmission terminal and a receiving terminal; and $\Delta \tau_{delay,sub}(R)$ represents a relative group delay on an $R^{th}$ reference subband;

the total delay $\tau_{Total,sub}(N)$ on the $N^{th}$ subband is determined by a following formula:

$$\tau_{Total,sub}(N) = phase(H(k_4)*conj(H(k_3)))/(-2\pi(k_4-k_3)$$
$$\Delta f_{scs}) = \tau_{LOS} + \Delta t + \Delta \tau_{delay,sub}(N);$$

where $k_4$ and $k_3$ represent any two subcarrier indices on the $N^{th}$ subband ($k_3 < k_4$), $H(k_3)$ represents a frequency domain channel response on a $k_3{}^{th}$ subcarrier, $H(k_4)$ represents a frequency domain channel response on a $k_4{}^{th}$ subcarrier, and $\Delta \tau_{delay,sub}(N)$ represents the relative group delay on the $N^{th}$ subband;

the differential value $\Delta \tau_{delay,sub,diff}(N)$ of the relative group delay on the $N^{th}$ subband is determined by a following formula:

$$\Delta \tau_{delay,sub,diff}(N) = \tau_{Total,sub}(N) - \tau_{Total,sub}(R) = \Delta \tau_{delay,sub}(N) - \Delta \tau_{delay,sub}(R).$$

In some embodiments, when compensating the local received signal or the frequency domain channel response, the processor obtains the compensated frequency domain channel response H'(k) by a following formula:

$$H'(k) = H(k)e^{j2\pi*k*\Delta f_{scs}*\Delta \tau_{delay,sub,diff}\left(floor\left(\frac{k-1}{Q}\right)+1\right)}, \; k = 1 \ldots (M*Q);$$

where a system bandwidth is divided into M subbands, each subband contains Q subcarriers, H(k) represents an uncompensated frequency domain channel response, $\Delta f_{scs}$ represents a subcarrier spacing, $$N = floor\left(\frac{k-1}{Q}\right) + 1,$$

and N represents an index value of a subband.

In some embodiments, the reporting the differential value of the relative group delay of the subband to the transmission terminal, specifically includes:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

In some embodiments, the processor is further configured to:

receive a differential value of a relative group delay of a subband;

compensate a transmission signal based on the differential value of the relative group delay of the subband.

In some embodiments, the processor compensates the transmission signal in frequency domain by a following formula:

$$X'(k) = X(k)e^{j2\pi*k*\Delta f_{scs}\left(\Delta \tau_{delay,sub,diff}\left(floor\left(\frac{k-1}{Q}\right)+1\right)\right)};$$

where X(k) represents a data symbol before compensation to be transmitted on a $k^{th}$ subcarrier, X'(k) represents a data symbol after compensation to be transmitted on the $k^{th}$ subcarrier, $\Delta f_{scs}$ represents a subcarrier spacing, $$N = floor\left(\frac{k-1}{Q}\right) + 1,$$

N represents an index value of a subband, and $\Delta \tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of subcarriers.

In some embodiments, the processor is further configured to:

map a compensated transmission signal X'(k) to the $k^{th}$ subcarrier for transmitting.

At the signal transmission terminal, a signal processing apparatus provided by an embodiment of the present application includes:

a memory configured to store program instructions;

a processor configured to invoke the program instructions stored in the memory and execute according to an obtained program:

receiving a differential value of a relative group delay of a subband;

compensating a transmission signal based on the differential value of the relative group delay of the subband.

In some embodiments, the processor compensates the transmission signal in frequency domain by a following formula:

$$X'(k) = X(k)e^{j2\pi*k*\Delta f_{scs}\left(\Delta \tau_{delay,sub,diff}\left(floor\left(\frac{k-1}{Q}\right)+1\right)\right)};$$

where X(k) represents a data symbol before compensation to be transmitted on a $k^{th}$ subcarrier, X'(k) represents a data symbol after compensation to be transmitted on the $k^{th}$ subcarrier, $\Delta f_{scs}$ represents a subcarrier spacing, $$N = floor\left(\frac{k-1}{Q}\right) + 1,$$

N represents an index value of a subband, and $\Delta \tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of subcarriers.

In some embodiments, the processor is further configured to:

map a compensated transmission signal X'(k) to the $k^{th}$ subcarrier for transmission.

On the LMF side, a signal processing apparatus provided by an embodiment of the present application includes:

a memory configured to store program instructions;

a processor configured to invoke the program instructions stored in the memory and execute according to an obtained program:

transmitting PRS configuration information to a terminal;

receiving a DL RSTD measurement reported by the terminal, and determining a position of the terminal base on known position information of base stations.

In some embodiments, the PRS configuration information includes at least one of:

a frequency domain location of a same CC or frequency domain locations of different CCs;

time domain location information of PRS;

frequency domain location information of PRS; or a notification that a transmission terminal or receiving terminal compensates a transmitted signal.

At the signal receiving terminal, another signal processing apparatus provided by an embodiment of the present application includes:

a first device configured to perform channel estimation processing based on a received PRS to obtain a frequency domain channel response;

a second device configured to determine a differential value of a relative group delay of a subband based on the frequency domain channel response;

a third device configured to compensate a locally received PRS signal or the frequency domain channel response based on the differential value of the relative group delay of the subband; or report the differential value of the relative group delay of the subband to a transmission terminal, where the differential value of the relative group delay of the subband is adopted to compensate a transmission signal.

At the signal transmission terminal, another signal processing apparatus provided by an embodiment of the present application includes:

a receiving device configured to receive a differential value of a relative group delay of a subband;

a compensation device configured to compensate a transmission signal based on the differential value of the relative group delay of the subband.

On the LMF side, another signal processing apparatus provided by an embodiment of the present application includes:

a transmitting device configured to transmit PRS configuration information to a terminal;

a positioning device configured to receive a DL RSTD measurement reported by the terminal, and determine a position of the terminal base on known position information of base stations.

Another embodiment of the present application provides a computing device, which includes a memory and a processor, where the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF FIGURES

In order to illustrate the embodiments of the present application more clearly, the accompanying figures which need to be used in describing the embodiments will be introduced below briefly. The accompanying figures described below are only some embodiments of the present application.

DETAILED DESCRIPTION

Figure 1:
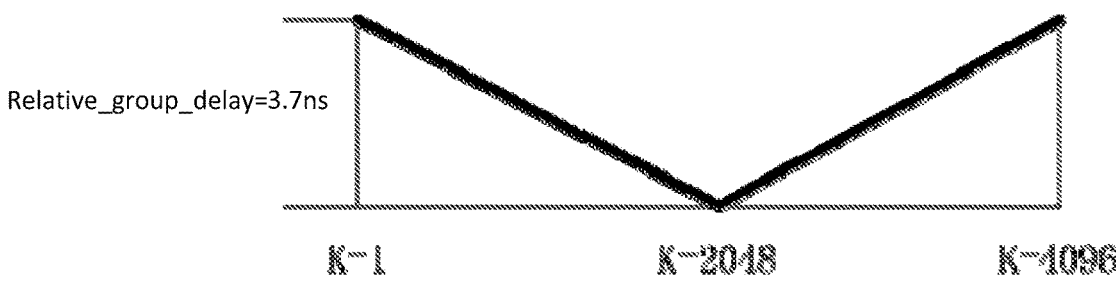
FIG. 1 is a schematic diagram of an ideal relative group delay provided by an embodiment of the present application.

The embodiments of the present application will be described clearly and completely below in combination with the accompanying drawings in embodiments of the present application. The described embodiments are only a part of embodiments of the present application but not all embodiments.

The 3rd Generation Partnership Project (3GPP) introduced a variety of measurement-based 5G positioning reference signals in the New Radio (NR) standard of 5G version 16 (Rel-16). The positioning methods of using measurement values related to the signal arrival time, for example, include:

NR Downlink Time Difference Of Arrival (DL-TDOA) positioning method;

NR Uplink Time Difference of Arrival (UL-TDOA) positioning method;

NR Multi-cell Round Trip Time (Multi-RTT) positioning method.

The common point of the above positioning methods is to use the measurement value related to the arrival time of the positioning reference signal for positioning. For example, the Downlink Time Difference Of Arrival (DL-TDOA) is positioning based on measuring the time difference of arrival of a Downlink Positioning Reference Signal (DL PRS), the Uplink Time Difference of Arrival (UL-TDOA) is positioning based on measuring the relative time difference of arrival of an Uplink Sounding Reference Signal (UL SRS), and the Multi-cell Round Trip Time (Multi-RTT) is positioning based on measuring the UE Rx-Tx time difference and gNB Rx-Tx time difference of the DL PRS signal and UL SRS signal. In these time-related measurement values, the information for positioning is the distance between a transmitter antenna and a receiver antenna, derived from the signal propagation delay between the transmitter antenna and the receiver antenna. However, these time-related measurement values are inevitably affected by other signal propagation delays. In order to improve the positioning accuracy, the effects of those signal propagation delays should be reduced and removed.

From the perspective of transmitting the positioning reference signal, there is a transmission delay (Tx Delay) between the moment when the positioning reference signal is generated and the moment when the positioning reference signal is transmitted by the transmitter antenna. From the perspective of receiving the positioning reference signal, there is also a reception delay (Rx Delay) from the moment when the positioning reference signal arrives at the receiving antenna to the moment when the positioning reference signal is detected.

However, there is currently no engineering-available method for measuring and compensating the relative group delay with high accuracy.

To this end, embodiments of the present application propose a method for measuring and compensating the relative group delay of the transmitting channel and receiving channel of the UE and the base station, and are applicable to various positioning methods (DL-TDOA, UL-TDOA, Multi-RTT, etc.) for positioning based on time-related measurements (such as DL RSTD, UL RTOA, UE Rx-Tx time difference and gNB Rx-Tx time difference).

The radio transmitting and receiving channels of the UE and base station are limited by the bandpass characteristics of filters, amplifiers and mixers. The delay of some electrical components (such as band-pass filter) in the radio frequency circuit varies greatly with the frequency within the carrier bandwidth range. Especially in the 5G NR system, the bandwidth covered by a carrier frequency band or carrier frequency is very large. The signal components of each subcarrier in the bandwidth will respectively experience different group delays, which are called relative group delays. The larger the bandwidth, the larger the relative group delay between subcarriers in the bandwidth. The relative difference in delay may be several nanoseconds (ns) or greater. Since 5G supports a large bandwidth and requires high-precision positioning, the impact of the relative group delay on positioning measurement in 5G positioning cannot be ignored.

The channel frequency response of the Line Of Sight (LOS) channel

For a single-path LOS channel, considering only the transmission delay of the LOS path, the clock deviation of the base station and UE as well as the absolute group delay and relative group delay of the base station and UE without considering the ICI conditions introduced by phase noise and frequency deviation, the frequency domain channel response H(k) on the $k^{th}$ subcarrier is:

$$H(k) = (e^{-j2\pi * k * \Delta f_{scs}(\tau_{LOS} + \Delta t + \Delta \tau_{delay}(k))} * e^{(-j2\pi f_c(\tau_{LOS} + \Delta t + \tau_{delay}) + j(\emptyset_0 + \emptyset_1))}) \quad \text{Formula (1).}$$

Here, the relevant variables have the following meanings: $\Delta \tau_{delay}(k)$ represents the relative group delay dependent on the subcarrier k:

for a downlink, $$\Delta \tau_{delay}(k) = \Delta \tau_{delay}^{UE,Rx}(k) + \Delta \tau_{delay}^{gNB,Tx}(k);$$

for an uplink, $$\Delta \tau_{delay}(k) = \Delta \tau_{delay}^{gNB,Rx}(k) + \Delta \tau_{delay}^{UE,Tx}(k);$$

$\tau_{delay}$ represents the absolute group delay dependent on fc: for a downlink, $$T_{delay} = T_{delay}^{UE,Rx} + \tau_{delay}^{gNB,Tx};$$

for an uplink, $$\tau_{delay} = \tau_{delay}^{gNB,Rx} + \tau_{delay}^{UE,Tx};$$

$\tau_{LOS}$ represents the transmission delay of the first path (that is, LOS path);

$\Delta t$ represents the cumulative sum of clock deviations of the base station and UE, where the clock deviations of the base station and UE may be positive or negative;

$\emptyset_0$ represents the initial phase of the transmission terminal;

$\emptyset_1$ represents the initial phase of the receiving terminal that demodulates local oscillation;

$\Delta f_{scs}$ represents the subcarrier spacing.

FIG. 1 shows a schematic diagram of an ideal relative group delay, where the abscissa represents the subcarrier index k, the ordinate represents the value of the relative group delay in ns, and Relative_group_delay represents the relative group delay.

However, there is currently no engineering-available method for measuring and compensating the relative group delay with high accuracy. If the relative group delay is not processed, the relative group delay will directly affect the accuracy of TOA estimation and thus affect the final UE positioning accuracy. Therefore, embodiments of the present application provide a signal processing method and apparatus, to implement the signal compensation based on the relative group delay, improve the accuracy of TOA estimation, and thus ultimately improve the UE positioning accuracy.

Here, the method and apparatus are based on the same application concept. Since the principle of the method to solve the problem is similar to that of the apparatus, the implementations of the apparatus and method can refer to each other, and the repeated description thereof will be omitted.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in the embodiments of the present application may be a device for providing the voice and/or data connectivity to the user, a handheld device with the wireless connection function, or other processing device connected to the wireless modem. In different systems, the terminal device may have different names. For example, in a 5G system, the terminal device may be referred to as User Equipment (UE). The wireless terminal device can communicate with one or more core networks via the RAN, and the wireless terminal device can be a mobile terminal, such as a mobile telephone (or called "cellular" telephone), and a computer with the mobile terminal, for example, can be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber unit, subscriber station, mobile station, mobile, remote station, access point, remote terminal, access terminal, user terminal, user agent, user device, which is not limited in the embodiments of the present application.

The network device involved in embodiments of the present application may be a base station, which may include a number of cells. Depending on application scenarios, the base station may also be called access point, or may refer to the device in the access network communicating with the wireless terminal via one or more sectors over the air interface or other names. The network device may be configured to perform the inter-conversion between the received air frame and Internet Protocol (IP) packet, and configured as the router between the wireless terminal device and the rest of the access network, where the rest of the access network may include IP networks. The network device may further coordinate the attribute management of the air interface. For example, the network device involved in embodiments of the present application can be a network device (Base Transceiver Station (BTS)) in the Global System of Mobile communication (GSM) or Code Division Multiple Access (CDMA), or can be a network device (NodeB) in the Wideband Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application.

Embodiments of the present application will be described below in detail with reference to the drawings of the specification. It should be noted that the showing order of the embodiments of the present application only represents the sequential order of the embodiments, but does not represent the pros and cons of the embodiments.

In the embodiments of the present application, the receiving terminal measures the phase slope value of the frequency domain channel response and obtains the differential value of the relative group delay through differential processing of different subbands, and then pre-compensates the received signal of the receiving terminal for the local received signal based on the differential value of the relative group delay, or reports the differential value of the relative group delay to the transmission terminal, and the transmission terminal pre-compensates the transmission signal.

In the following, the UE-assisted downlink positioning scheme is taken as an example to illustrate (in this case, the transmission terminal is a base station, and the receiving terminal is a UE). The embodiments of the present application are also applicable to the uplink positioning scheme (in this case, the transmission terminal is a UE, and the receiving terminal is a base station).

UE Side

Step 1: The UE receives the PRS signal configuration information notified by the LMF.

Step 2: The UE performs channel estimation processing based on the received PRS signal to obtain a frequency domain channel response H(k), for example, the channel estimation algorithm may be an algorithm based on Inverse Discrete Fourier Transform (IDFT).

Step 3: The UE obtains a differential value $\Delta\tau_{delay,sub,diff}$ (N) of the relative group delay by measuring the phase slope value of the correlation value of the frequency domain channel response H(k) through the frequency domain segmentation correlation method or other embodiments, where $\Delta\tau_{delay,sub,diff}$(N) represents a differential value of the relative group delay on the $N^{th}$ subband, and N represents a subband index value.

The system bandwidth is divided into M subbands, and each subband contains Q subcarriers (M=N_used/Q, where N_used represents the total number of available subcarriers, and M and Q are both positive integers greater than or equal to 2). It is assumed that the relative group delay $\Delta\tau_{delay}$(k) (k belongs to an index set contained in one subband) basically remains unchanged within each subband, so the phase slope value of the frequency domain channel response is measured, and the differential value of the relative group delay is obtained through differential processing of different subbands.

According to actual conditions, a subband is selected as the reference subband R. The relative group delay of the reference subband R is taken as a benchmark, and the relative group delay on the $N^{th}$ subband (N≠R) is compensated with reference to this benchmark, where N>=1. The width of the subband may be flexibly configured by the LMF.

Assuming that $k_2$ and $k_1$ represent any two subcarrier indices on the reference subband R ($k_1<k_2$), the total delay $\tau_{Total,sub}$(R) on the reference subband R can be calculated:

$$\tau_{Total,sub}(R)=\text{phase}(H(k_2)^*\text{conj}(H(k_1)))/(-2\pi(k_1-k_2))$$
$$\Delta f_{scs}=\tau_{LOS}+\Delta t+\Delta\tau_{delay,sub}(R) \qquad \text{Formula (2)}.$$

Here, the definition of H(k) refers to Formula (1), $\Delta f_{scs}$ is the subcarrier spacing, $\Delta\tau_{delay,sub}$(R) represents the relative group delay on the Rt h reference subband, and R represents the index value of the reference subband.

Assuming that $k_4$ and $k_3$ represent any two subcarrier indices on the $N^{th}$ (NSR) subband ($k_3<k_4$), the total delay $\tau_{Total,sub}$ (N) on the $N^{th}$ subband can be calculated:

$$\tau_{Total,sub}(N)=\text{phase}(H(k_4)^*\text{conj}(H(k_3)))/(-2\pi(k_4-k_3))$$
$$\Delta f_{scs}=\tau_{LOS}+\Delta t+\Delta\tau_{delay,sub}(N) \qquad \text{Formula (3)}.$$

The differential value $\Delta\tau_{delay,sub,diff}$(N) of the relative group delay on the $N^{th}$ subband may be obtained by subtracting Formula (2) from Formula (3):

$$\Delta\tau_{delay,sub,diff}(N)=\tau_{Total,sub}(N)-\tau_{Total,sub}(R)=\Delta\tau_{delay,sub}$$
$$(N)-\Delta\tau_{delay,sub}(R) \qquad \text{Formula (4)}.$$

Here, the definition of H(k) refers to Formula (1), $\Delta f_{scs}$ is the subcarrier spacing, $\Delta\tau_{delay,sub}$(N) represents the relative group delay on the $N^{th}$ subband, and N represents the index value of the subband.

Figure 2:
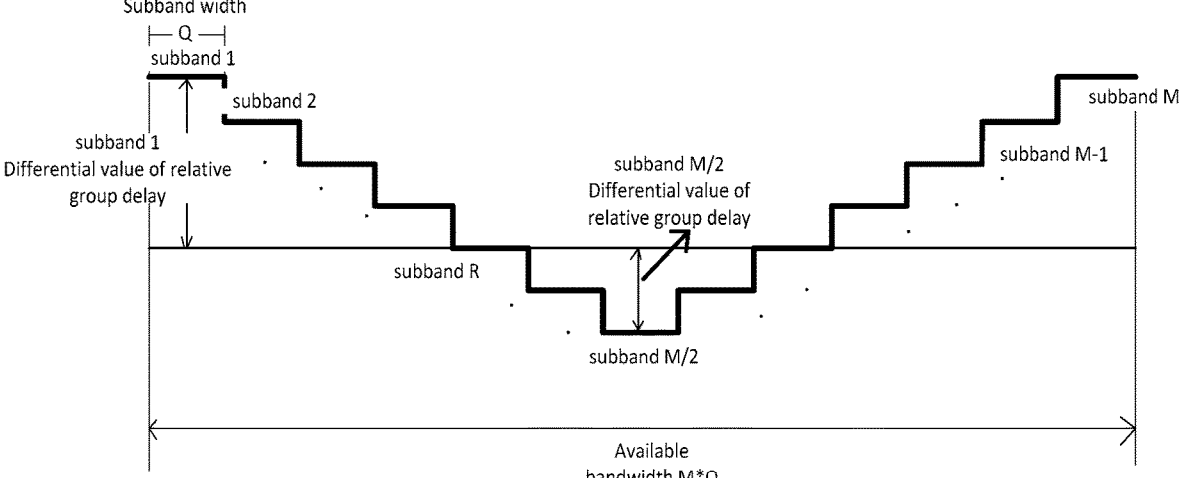
FIG. 2 is a schematic diagram of a relative group delay provided by an embodiment of the present application.

In step 3, a schematic diagram of a relative group delay is shown in FIG. 2.

Step 4: The UE compensates the received signal of the receiving terminal for the local received signal based on the differential value of the relative group delay of each subband, or the UE reports the differential value $\Delta\tau_{delay,diff}$(N) of the relative group delay of each subband to the transmission terminal, and the transmission terminal pre-compensates the transmission signal.

Here, the reported differential value $\Delta\tau_{delay,diff}$(N) of the relative group delay may be in the form of absolute value or index mapping value:

Opt 1) For the form of absolute value, the differential value $\Delta\tau_{delay,diff}$(N) of the relative group delay is directly quantified and then directly reported;

Opt 2) For the form of index mapping value, the UE may quantize the pre-compensated parameter value $\Delta\tau_{delay,diff}$(N), and then report a quantization index value (index) according to the calculation result based on a quantization compensation table pre-defined or broadcast by the LMF, that is, the quantization compensation table is preset and includes the corresponding relationship between the quantized differential value of the relative group delay and the index value, and the index value corresponding to the quantized differential value of the relative group delay can be directly reported by looking up the table, saving the reporting overhead.

The UE compensates the received signal of the receiving terminal for the local received signal based on the relative group delay, and obtains the frequency domain channel response H'(k) after compensation:

$$H'(k) = H(k)e^{j2\pi*k*\Delta f_{scs}\Delta\tau_{delay,sub,diff}\left(floor\left(\frac{k-1}{Q}\right)+1\right)}, \quad \text{Formula (5)}$$

$$k = 1 \ldots (M*Q);$$

$$H'(k) = \left(e^{-j2\pi*k*\Delta f_{scs}\left(\tau_{LOS}+\Delta t+\Delta\tau_{delay}(k)-\Delta\tau_{delay,diff}\left(floor\left(\frac{k-1}{Q}\right)+1\right)\right)}\right)_* \quad \text{Formula (6)}$$

$$e^{\left(-j2\pi f_c\left(\tau_{LOS}+\Delta t+\tau_{delay}\right)+j(\phi_0+\phi_1)\right)}\right).$$

Here, due to $\Delta\tau_{delay,sub}(N) = \Delta\tau_{delay}(k)$, $$\Delta\tau_{delay}(k) - \Delta\tau_{delay,sub,diff}\left(floor\left(\frac{k-1}{Q}\right)+1\right) =$$

$$\Delta\tau_{delay,sub}(N) - \Delta\tau_{delay,sub,diff}(N) = \Delta\tau_{delay,sub}(R)$$

is a fixed value in the full bandwidth range and does not change with subband change, where $$N = floor\left(\frac{k-1}{Q}\right) + 1$$

represents the index value of the subband.

M represents the total number of subbands, Q represents the number of subcarriers included in one subband, and M*Q is the total number of subcarriers.

Step 5: The UE performs TOA measurement based on H'(k) after compensation in Step 4 to obtain a more accurate TOA measurement value and a DL RSTD measurement after single difference.

Step 6: The UE reports the DL RSTD measurement obtained in Step 5 to a Location Management Function (LMF) entity.

Base Station Side

Step 1: The base station receives the differential value $\Delta\tau_{delay,sub,diff}$(N) of the relative group delay of each subband reported by the UE.

Step 2: The base station pre-compensates the transmission signal X(k) in frequency domain based on the differential value $\Delta\tau_{delay,sub,diff}$(N) of the relative group delay of each subband reported by the UE, and then maps the pre-compensated X'(k) to the $k^{th}$ subcarrier for transmitting.

The base station pre-compensates the transmission signal based on the differential value $\Delta\tau_{delay,sub,diff}$(N) of the relative group delay reported by the UE:

$$X'(k) = X(k)e^{j2\pi*k*\Delta f_{scs}\left(\Delta\tau_{delay,sub,diff}\left(floor\left(\frac{k-1}{Q}\right)+1\right)\right)}; \quad \text{Formula (7)}$$

here, the relevant variables have the following meanings:

X(k) represents a data symbol without pre-compensation on the $k^{th}$ subcarrier at the transmission terminal (k=1 ... (M*Q)), X'(k) represents a data symbol after pre-compensation on the $k^{th}$ subcarrier, M represents the total number of subbands, Q represents the number of subcarriers included in one subband, and M*Q represents the total number of subcarriers.

LMF Side

Step 1: transmit the PRS configuration information to UE.

The PRS configuration information includes but not limited to: the frequency domain location(s) of the same Component Carrier (CC) or different CCs, or the time-frequency domain location information of the PRS. The scheme whether the UE side performs compensation or the base station performs compensation is notified. The notification may be carried in the PRS configuration information, or the notification may be sent separately, or it may be pre-agreed whether the UE side performs compensation or the base station performs compensation without transmitting the notification.

Step 2: The LMF receives the DL RSTD measurement reported by the UE, and calculates the position of the UE base on the known position of the base station and other information.

Embodiment 1 and Embodiment 2 are given below by taking the UE-assisted downlink positioning solution as an example, where Embodiment 1 is a compensation scheme of the receiving terminal at the UE side, and Embodiment 2 is a pre-compensation scheme of the transmission terminal at the base station side.

Embodiment 1

UE Side

Step 1: The UE receives the PRS signal configuration information notified by the LMF.

Step 2: The UE performs channel estimation processing based on the received PRS signal to obtain a frequency domain channel response H(k), for example, performs IDFT-based window removal and noise suppression processing.

Step 3: The UE obtains a differential value $\Delta\tau_{delay,diff}(N)$ of the relative group delay by measuring the phase slope value of the correlation value of the frequency domain channel response H(k) through the frequency domain segmentation correlation method or other solution.

Assuming that the number of subcarriers in the total bandwidth is 3240, the system bandwidth is divided into 270 subbands, and each subband contains 12 subcarriers (that is, one PRB). It is assumed that the relative group delay $\Delta\tau_{delay}(k)$ basically remains unchanged within each subband, so the phase slope value of the frequency domain channel response is measured, and the differential value of the relative group delay is obtained through differential processing of different subbands.

Here, the first subband is selected as the reference subband, the relative group delay of the reference subband is taken as a benchmark, and the compensation on the $N^{th}$ ($N\neq1$) subband refers to this benchmark. Note: The reference subband position may be any subband.

Assuming that $k_2$ and $k_1$ represent any two subcarrier indices on the reference subband 1 ($k_1<k_2$), the total delay $\tau_{Total,sub}(1)$ on the reference subband 1 can be calculated:

$$\tau_{Total,sub}(1)=\text{phase}(H(k_2)*\text{conj}(H(k_1)))/(-2\pi(k_2-k_1)$$
$$\Delta f_{scs})=\tau_{LOS}+\Delta t+\Delta\tau_{delay,sub}(1) \qquad \text{Formula (8)}.$$

Here, the definition of H(k) refers to Formula (1).

Assuming that $k_4$ and $k_3$ represent any two subcarrier indices on the $N^{th}$ ($N\neq1$) subband ($k_3<k_4$), the total delay $\tau_{Total,sub}(N)$ on the $N^{th}$ subband can be calculated:

$$\tau_{Total,sub}(N)=\text{phase}(H(k_4)*\text{conj}(H(k_3)))/(-2\pi(k_4-k_3)$$
$$\Delta f_{scs})=\tau_{LOS}+\Delta t+\Delta\tau_{delay,sub}(N) \qquad \text{Formula(9)}.$$

The differential value $\Delta\tau_{delay,sub,diff}(N)$ of the relative group delay on the $N^{th}$ subband may be obtained by subtracting Formula (9) from Formula (8):

$$\Delta\tau_{delay,sub,diff}(N)=\tau_{Total,sub}(N)-\tau_{Total,sub}(1)=\Delta\tau_{delay,sub}$$
$$(N)-\Delta\tau_{delay,sub}(R) \qquad \text{Formula (10)}.$$

Step 4: The UE pre-compensates the received signal of the receiving terminal for the local received signal based on the differential value of the relative group delay of each subband.

The UE pre-compensates the received signal of the receiving terminal for the local received signal based on the relative group delay, and obtains the frequency domain channel response H'(k) after compensation.

$$H'(k) = H(k)e^{j2\pi*k*\Delta f_{scs}\Delta\tau_{delay,sub,diff}\left(floor\left(\frac{k-1}{12}\right)+1\right)}, \qquad \text{Formula (11)}$$

$$k = 1 \ldots 3240;$$

$$H'(k) = \qquad \text{Formula (12)}$$
$$\left(e^{-j2\pi*k*\Delta f_{scs}\left(\tau_{LOS}+\Delta t+\Delta\tau_{delay}(k)-\Delta\tau_{delay,subdiff}\left(floor\left(\frac{k-1}{12}\right)+1\right)\right)}\right)*$$
$$e^{\left(-j2\pi f_c\left(\tau_{LOS}+\Delta t+\tau_{delay}\right)+j(\phi_0+\phi_1)\right)}\right).$$

Here, $$\Delta\tau_{delay}(k) - \Delta\tau_{delay,subdiff}\left(floor\left(\frac{k-1}{12}\right)+1\right)$$

is a fixed value in the full bandwidth range and does not change with subband change, and $$N = \text{floor}\left(\frac{k-1}{12}\right)+1$$

represents the index value of the subband.

Step 5: The UE performs TOA measurement based on H'(k) after compensation in Step 4 to obtain a more accurate TOA measurement value and a DL RSTD measurement after single difference.

Step 6: The UE reports the DL RSTD measurement obtained in Step 5 to the LMF.

LMF Side

Step 1: transmit the PRS configuration information to UE.

The PRS configuration information includes but not limited to: the frequency domain location(s) of the same CC or frequency domain locations of different CCs, the time-frequency domain location information of the PRS, or a notification that notifies the UE side to perform phase compensation on the frequency domain channel response of the received PRS signal.

Step 2: The LMF receives the DL RSTD measurement reported by the UE, and calculates the position of the UE base on the known position of the base station and other information.

Embodiment 2

UE Side

Step 1: The UE receives the PRS signal configuration information notified by the LMF.

Step 2: The UE performs channel estimation processing based on the received PRS signal to obtain a frequency domain channel response H(k), for example, performs IDFT-based window removal and noise suppression processing.

Step 3: The UE obtains a differential value $\Delta\tau_{delay,diff}(N)$ of the relative group delay by measuring the phase slope value of the correlation value of the frequency domain channel response H(k) through the frequency domain segmentation correlation method or other solution.

Assuming that the number of subcarriers in the total bandwidth is 3240, the system bandwidth is divided into 810 subbands, and each subband contains 4 subcarriers. It is assumed that the relative group delay $\Delta\tau_{delay}(k)$ basically remains unchanged within each subband, so the phase slope value of the frequency domain channel response is measured, and the differential value of the relative group delay is obtained through differential processing of different subbands.

Here, the R=$405^{th}$ subband is selected as the reference subband, the relative group delay of the reference subband is taken as a benchmark, and the compensation on the $N^{th}$ ($N\neq405$) subband refers to this benchmark.

Assuming that $k_2$ and $k_1$ represent any two subcarrier indices on the reference subband 405 ($k_1<k_2$), the total delay $\tau_{Total,sub}(405)$ on the reference subband 1 can be calculated:

$$\tau_{Total,sub}(405)=\text{phase}(H(k_2)*\text{conj}(H(k_1)))/(-2\pi(k_2-k_1)$$
$$\Delta f_{scs})=\tau_{LOS}+\Delta t+\Delta\tau_{delay,sub}(405) \qquad \text{Formula (13)}.$$

Here, the definition of H(k) refers to Formula (1).

Assuming that $k_4$ and $k_3$ represent any two subcarrier indices on the $N^{th}$ ($N\neq405$) subband ($k_3<k_4$), the total delay $\tau_{Total,sub}(N)$ on the $N^{th}$ subband can be calculated:

$$\tau_{Total,sub}(N)=\text{phase}(H(k_4)*\text{conj}(H(k_3)))/(-2\pi(k_4-k_3)$$
$$\Delta f_{scs})=\tau_{LOS}+\Delta t+\Delta\tau_{delay,sub}(N) \qquad \text{Formula (14)}.$$

The differential value $\Delta\tau_{delay,sub,diff}(N)$ of the relative group delay on the $N^{th}$ subband may be obtained by subtracting Formula (14) from Formula (13):

$$\Delta\tau_{delay,sub,diff}(N)=\tau_{Total,sub}(N)-\tau_{Total,sub}(405)= \Delta\tau_{delay,sub}(N)-\Delta\tau_{delay,sub}(405) \qquad \text{Formula (15).}$$

Step 4: The UE reports the differential value $\Delta\tau_{delay,sub,diff}(N)$ of the relative group delay of each subband to the transmission terminal, and the transmission terminal pre-compensates the transmission signal.

Here, the reported differential value $\Delta\tau_{delay,diff}(N)$ of the relative group delay may be in the form of absolute value or index mapping value:

Opt 1) For the form of absolute value, the differential value $\Delta\tau_{delay,diff}(N)$ of the relative group delay is directly quantified and then directly reported.

Opt 2) For the form of index mapping value, the UE may quantize the pre-compensated parameter value $\Delta\tau_{delay,diff}(N)$, and then report a quantization index value (index) according to the calculation result based on a quantization compensation table pre-defined or broadcast by the LMF, to save the reporting overhead.

Step 5: The UE performs TOA measurement based on H'(k) after compensation in Step 4 to obtain a more accurate TOA measurement value and a DL RSTD measurement after single difference.

Step 6: The UE reports the DL RSTD measurement obtained in Step 5 to the LMF.

Base Station Side

Step 1: The base station receives the differential value $\Delta\tau_{delay,diff}(N)$ of the relative group delay of each subband reported by the UE.

Step 2: The base station pre-compensates the transmission signal X(k) in frequency domain based on the differential value of the relative group delay of each subband reported by the UE, and then maps the pre-compensated X'(k) to the $k^{th}$ subcarrier for transmitting.

The UE reports the differential value of the relative group delay of each subband to the transmission terminal, and the base station performs pre-compensation on the transmission signal based on the differential value of the relative group delay reported by the UE:

$$X'(k) = X(k)e^{j2\pi*k*\Delta f_{scs}\left(\Delta\tau_{delay,diff}\left(floor\left(\frac{k-1}{4}\right)+1\right)\right)}; \qquad \text{Formula (16)}$$

here, X(k) represents a data symbol without pre-compensation on the $k^{th}$ subcarrier at the transmission terminal (k=1 ... 3240), and X'(k) represents a data symbol after pre-compensation.

LMF Side

Step 1: transmit the PRS configuration information to UE.

The PRS configuration information includes but not limited to: the frequency domain location(s) of the same CC or frequency domain locations of different CCs, the time-frequency domain location information of the PRS, and a notification that notifies the base station to perform phase compensation on the transmitted PRS signal.

Step 2: The LMF receives the DL RSTD measurement reported by the UE, and calculates the position of the UE base on the known position of the base station and other information.

To sum up, in combination with the accompanying drawings, the embodiments of the present application.

Figure 3:
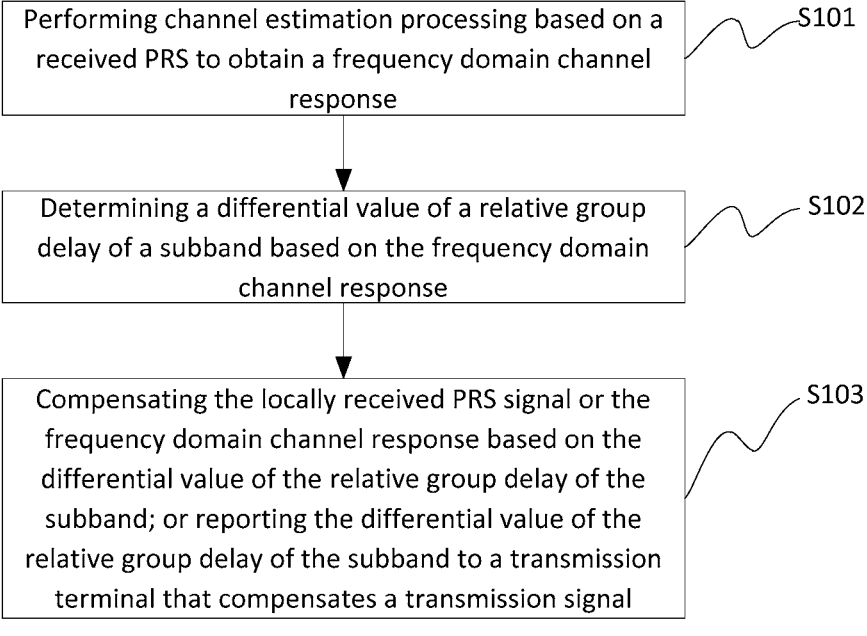
FIG. 3 is a schematic flowchart of a signal processing method at the receiving terminal provided by an embodiment of the present application.

Referring to FIG. 3, at the signal receiving terminal, a signal processing method provided by an embodiment of the present application includes:

S101: performing channel estimation processing based on a received PRS to obtain a frequency domain channel response;

S102: determining a differential value of a relative group delay of a subband based on the frequency domain channel response;

S103: compensating the locally received PRS signal or the frequency domain channel response based on the differential value of the relative group delay of the subband; or reporting the differential value of the relative group delay of the subband to a transmission terminal that compensates a transmission signal.

Here, the receiving terminal may be a UE, and the transmission terminal may be a base station; or, the receiving terminal may be a base station, and the transmission terminal may be a UE.

In this method, the channel estimation processing is performed based on the received PRS to obtain the frequency domain channel response; the differential value of the relative group delay of the subband is determined based on the frequency domain channel response; the locally received PRS signal or the frequency domain channel response is compensated based on the differential value of the relative group delay of the subband; or the differential value of the relative group delay of the subband is reported to the transmission terminal that compensates the transmission signal, to improve the accuracy of TOA estimation by compensating the relative group delay within the full bandwidth, and thus ultimately improve the UE positioning accuracy.

If the receiving terminal is a terminal, when compensating the locally received PRS signal, the method further includes:

performing TOA measurement based on a compensated PRS signal, to obtain a TOA measurement value and a DL RSTD measurement.

In some embodiments, the method further includes:

reporting the DL RSTD measurement to an LMF entity.

In some embodiments, the DL RSTD measurement is a DL RSTD measurement after performing single differential processing on the TOA measurement value.

In some embodiments, determining the differential value of the relative group delay of the subband based on the frequency domain channel response, includes:

determining a reference subband R, and a total delay $\tau_{Total,sub}(R)$ on the reference subband R;

determining a total delay $\tau_{Total,sub}(N)$ on an $N^{th}$ (NR) subband;

determining a differential value $\Delta\tau_{delay,sub,diff}(N)$ of a relative group delay on the $N^{th}$ subband base on the total delay $\tau_{Total,sub}(R)$ on the reference subband R and the total delay $\tau_{Total,sub}(N)$ on the $N^{th}$ subband.

In some embodiments, the total delay on the reference subband R is determined by a following formula:

$$\tau_{Total,sub}(R)=phase(H(k_2)*conj(H(k_1)))/(-2\pi(k_2-k_1)) \\ \Delta f_{scs})=\tau_{LOS}+\Delta t+\Delta\tau_{delay,sub}(R)$$

where $k_2$ and $k_1$ represent any two subcarrier indices on the reference subband R ($k_1 < k_2$), $\Delta f_{scs}$ represents a subcarrier spacing; $H(k_1)$ represents a frequency domain channel response on a $k_1^{th}$ subcarrier, $H(k_2)$ represents a frequency domain channel response on a $k_2^{th}$ subcarrier; $\tau_{LOS}$ represents a transmission delay of an LOS path; $\Delta t$ represents a cumulative sum of clock offsets between the transmission terminal and a receiving terminal; and $\Delta\tau_{delay,sub}(R)$ represents a relative group delay on an $R^{th}$ reference subband;

the total delay on the $N^{th}$ subband is determined by a following formula:

$$\tau_{Total,sub}(N)=\text{phase}(H(k_4)^*\text{conj}(H(k_3)))/(-2\pi(k_4-k_3))$$
$$\Delta f_{scs})=\tau_{LOS}+\Delta t+\Delta\tau_{delay,sub}(N)$$

where $k_4$ and $k_3$ represent any two subcarrier indices on the $N^{th}$ subband ($k_3 < k_4$), $H(k_3)$ represents a frequency domain channel response on a $k_3^{th}$ subcarrier, $H(k_4)$ represents a frequency domain channel response on a $k_4^{th}$ subcarrier, and $\Delta\tau_{delay,sub}(N)$ represents the relative group delay on the $N^{th}$ subband;

the differential value of the relative group delay on the $N^{th}$ subband is determined by a following formula:

$$\Delta\tau_{delay,sub,diff}(N)=\tau_{Total,sub}(N)-\tau_{Total,sub}(R)=\Delta\tau_{delay,sub}$$
$$(N)-\Delta\tau_{delay,sub}(R)$$

In some embodiments, when the local received signal is compensated, the compensated frequency domain channel response H'(k) is obtained by a following formula:

$$H'(k) = H(k)e^{j2\pi*k*\Delta f_{scs}*\Delta\tau_{delay,sub,diff}\left(floor\left(\frac{k-1}{Q}\right)+1\right)}, k = 1...(M*Q);$$

where a system bandwidth is divided into M subbands, each subband contains Q subcarriers, H(k) represents an uncompensated frequency domain channel response, $\Delta f_{scs}$ represents a subcarrier spacing, $$N = \text{floor}\left(\frac{k-1}{Q}\right) + 1,$$

and N represents an index value of a subband.

In some embodiments, reporting the differential value of the relative group delay of the subband to the transmission terminal, includes:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

Figure 4:
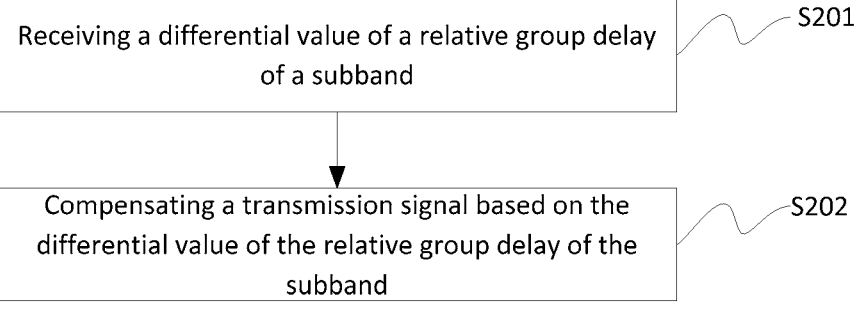
FIG. 4 is a schematic flowchart of a signal processing method at the transmission terminal provided by an embodiment of the present application.

Correspondingly, referring to FIG. 4, at the signal transmission terminal, a signal processing method provided by an embodiment of the present application includes:

S201: receiving a differential value of a relative group delay of a subband;

S202: compensating a transmission signal based on the differential value of the relative group delay of the subband.

Here, the receiving terminal may be a UE, and the transmission terminal may be a base station; or, the receiving terminal may be a base station, and the transmission terminal may be a UE.

In some embodiments, the transmission signal in frequency domain is compensated by a following formula:

$$X'(k) = X(k)e^{j2\pi*k*\Delta f_{scs}\left(\Delta\tau_{delay,sub,diff}\left(floor\left(\frac{k-1}{Q}\right)+1\right)\right)};$$

where X(k) represents a data symbol before compensation to be transmitted on a $k^{th}$ subcarrier, X'(k) represents a data symbol after compensation to be transmitted on the $k^{th}$ $$N = \text{floor}\left(\frac{k-1}{Q}\right) + 1,$$

subcarrier, $\Delta f_{scs}$ represents a subcarrier spacing, N represents an index value of a subband, and $\Delta\tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of sub carriers.

In some embodiments, the method further includes:

mapping a compensated transmission signal X'(k) to the $k^{th}$ subcarrier for transmitting.

Figure 5:
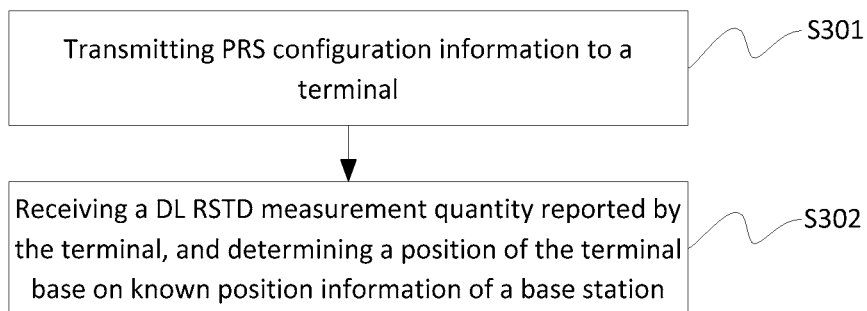
FIG. 5 is a schematic flowchart of a signal processing method on the LMF side provided by an embodiment of the present application.

Correspondingly, referring to FIG. 5, on the LMF side, a signal processing method provided by an embodiment of the present application includes:

S301: transmitting PRS configuration information to a terminal;

S302: receiving a DL RSTD measurement reported by the terminal, and determining a position of the terminal base on known position information of a base station.

In some embodiments, the PRS configuration information includes at least one of:

a frequency domain location of a same CC or frequency domain locations of different CCs;

time domain location information of PRS;

frequency domain location information of PRS; or a notification that a transmission terminal or receiving terminal compensates a transmitted signal.

Figure 6:
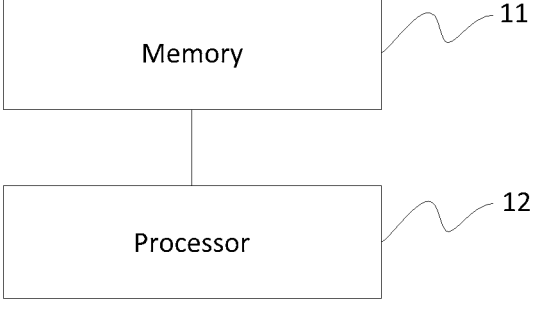
FIG. 6 is a schematic structural diagram of a signal processing apparatus provided by an embodiment of the present application.

Referring to FIG. 6, a signal processing apparatus provided by an embodiment of the present application includes:

a memory 11 configured to store program instructions;

a processor 12 configured to invoke program instructions stored in the memory 11, and perform any one of the methods provided in the embodiments of the present application in accordance with the obtained program.

The signal processing apparatus provided by the embodiment of the present application may be an apparatus at the receiving terminal, or may be an apparatus at the transmission terminal, or may be an apparatus at the LMF side.

In some embodiments, at the signal receiving terminal:

the processor 12 is configured to invoke the program instructions stored in the memory 11, and in accordance with the obtained program, perform the process of:

performing channel estimation processing based on a received PRS to obtain a frequency domain channel response;

determining a differential value of a relative group delay of a subband based on the frequency domain channel response;

compensating the locally received PRS signal or the frequency domain channel response based on the differential value of the relative group delay of the subband; or reporting the differential value of the relative group delay of the subband to a transmission terminal, where the differential value of the relative group delay of the subband is configured to compensate a transmission signal.

In some embodiments, when compensating the locally received PRS signal or the frequency domain channel response, the processor 12 is further configured to:

perform TOA measurement based on a compensated PRS signal or frequency domain channel response, to obtain a TOA measurement value and a DL RSTD measurement.

In some embodiments, the processor 12 is further configured to:

report the DL RSTD measurement to an LMF entity.

In some embodiments, the DL RSTD measurement is a DL RSTD measurement after performing single differential processing on the TOA measurement value.

In some embodiments, determining the differential value of the relative group delay of the subband based on the frequency domain channel response, specifically includes:

determining a reference subband R, and a total delay $\tau_{Total,sub}(R)$ on the reference subband R;

determining a total delay $\tau_{Total,sub}(N)$ on an $N^{th}$ ($N \neq R$) subband;

determining a differential value $\Delta\tau_{delay,sub,diff}(N)$ of a relative group delay on the $N^{th}$ subband base on the total delay $\tau_{Total,sub}(R)$ on the reference subband R and the total delay $\tau_{Total,sub}(N)$ on the $N^{th}$ subband.

In some embodiments, the total delay on the reference subband R is determined by a following formula:

$$\tau_{Total,sub}(R)=\text{phase}(H(k_2)*\text{conj}(H(k_1)))/(-2\pi(k_2-k_1))$$
$$\Delta f_{scs})=\tau_{LOS}+\Delta t+\Delta\tau_{delay,sub}(R)$$

where $k_2$ and $k_1$ represent any two subcarrier indices on the reference subband R ($k_1 < k_2$), $\Delta f_{scs}$ represents a subcarrier spacing; $H(k_1)$ represents a frequency domain channel response on a $k_1^{th}$ subcarrier, $H(k_2)$ represents a frequency domain channel response on a $k_2^{th}$ subcarrier; $\tau_{LOS}$ represents a transmission delay of an LOS path; $\Delta t$ represents a cumulative sum of clock offsets between the transmission terminal and a receiving terminal; and $\Delta\tau_{delay,sub}(R)$ represents a relative group delay on an $R^{th}$ reference subband;

the total delay on the $N^{th}$ subband is determined by a following formula:

$$\tau_{Total,sub}(N)=\text{phase}(H(k_4)*\text{conj}(H(k_3)))/(-2\pi(k_4-k_3))$$
$$\Delta f_{scs})=\tau_{LOS}+\Delta t+\Delta\tau_{delay,sub}(N)$$

where $k_4$ and $k_3$ represent any two subcarrier indices on the $N^{th}$ subband ($k_3 < k_4$), $H(k_3)$ represents a frequency domain channel response on a $k_1^{th}$ subcarrier, $H(k_4)$ represents a frequency domain channel response on a $k_4^{th}$ subcarrier, and $\Delta\tau_{delay,sub}(N)$ represents the relative group delay on the $N^{th}$ subband;

the differential value of the relative group delay on the $N^{th}$ subband is determined by a following formula:

$$\Delta\tau_{delay,sub,diff}(N)=\tau_{Total,sub}(N)-\tau_{Total,sub}(R)=\Delta\tau_{delay,sub}(N)-\Delta\tau_{delay,sub}(R)$$

In some embodiments, when compensating the local received signal, the processor obtains the compensated frequency domain channel response $H'(k)$ by a following formula:

$$H'(k) = H(k)e^{j2\pi*k*\Delta f_{scs}*\Delta\tau_{delay,sub,diff}\left(floor\left(\frac{k-1}{Q}\right)+1\right)}, k = 1 \ldots (M*Q);$$

where a system bandwidth is divided into M subbands, each subband contains Q subcarriers, $H(k)$ represents an uncompensated frequency domain channel response, $\Delta f_{scs}$ represents a subcarrier spacing, $$N = \text{floor}\left(\frac{k-1}{Q}\right)+1,$$

and N represents an index value of a subband.

In some embodiments, reporting the differential value of the relative group delay of the subband to the transmission terminal, includes:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

The signal processing device provided by the embodiment of the present application not only has the function of the receiving terminal, but also has the function of the transmission terminal.

In some embodiments, the processor 12 is further configured to:

receive a differential value of a relative group delay of a subband;

compensate a transmission signal based on the differential value of the relative group delay of the subband.

In some embodiments, the processor compensates the transmission signal in frequency domain by a following formula:

$$X'(k) = X(k)e^{j2\pi*k*\Delta f_{scs}\left(\Delta\tau_{delay,sub,diff}\left(floor\left(\frac{k-1}{Q}\right)+1\right)\right)};$$

where $X(k)$ represents a data symbol before compensation to be transmitted on a $k^{th}$ subcarrier, $X'(k)$ represents a data symbol after compensation to be transmitted on the $k^{th}$ subcarrier, $\Delta f_{scs}$ represents a subcarrier spacing, $$N = \text{floor}\left(\frac{k-1}{Q}\right)+1,$$

N represents an index value of a subband, and $\Delta\tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of subcarriers.

In some embodiments, the processor 12 is further configured to:

map a compensated transmission signal X'(k) to the $k^{th}$ subcarrier for transmitting.

At the signal transmission terminal, the processor 12 is configured to invoke the program instructions stored in the memory 11, and in accordance with the obtained program, perform the process of:

receiving a differential value of a relative group delay of a subband;

compensating a transmission signal based on the differential value of the relative group delay of the subband.

In some embodiments, the processor compensates the transmission signal in frequency domain by a following formula:

$$X'(k) = X(k)e^{j2\pi*k*\Delta f_{scs}\left(\Delta\tau_{delay,sub,diff}\left(floor\left(\frac{k-1}{Q}\right)+1\right)\right)};$$

where X(k) represents a data symbol before compensation to be transmitted on a $k^{th}$ subcarrier, X'(k) represents a data symbol after compensation to be transmitted on the $k^{th}$ subcarrier, $\Delta f_{scs}$ represents a subcarrier spacing, $$N = \text{floor}\left(\frac{k-1}{Q}\right) + 1,$$

N represents an index value of a subband, and $\Delta \tau_{delay,sub,diff}(N)$ represents a differential value of a relative group delay on an $N^{th}$ subband, where k=1 . . . (M*Q), M represents the total number of subbands, Q represents the number of subcarriers contained in each subband, and M*Q represents the total number of subcarriers.

In some embodiments, the processor 12 is further configured to:

map a compensated transmission signal X'(k) to the $k^{th}$ subcarrier for transmitting.

On the LMF side, the processor 12 is configured to invoke the program instructions stored in the memory 11, and in accordance with the obtained program, perform the process of:

transmitting PRS configuration information to a terminal;

receiving a DL RSTD measurement reported by the terminal, and determining a position of the terminal base on known position information of a base station.

In some embodiments, the PRS configuration information includes at least one of:

a frequency domain location of a same CC or frequency domain locations of different CCs;

time domain location information of PRS;

frequency domain location information of PRS; or a notification that a transmission terminal or receiving terminal compensates a transmitted signal.

The signal processing apparatus provided by the embodiment of the present application may be a base station or a terminal no matter whether it is an apparatus at the receiving terminal or an apparatus at the transmission terminal.

Figure 7:
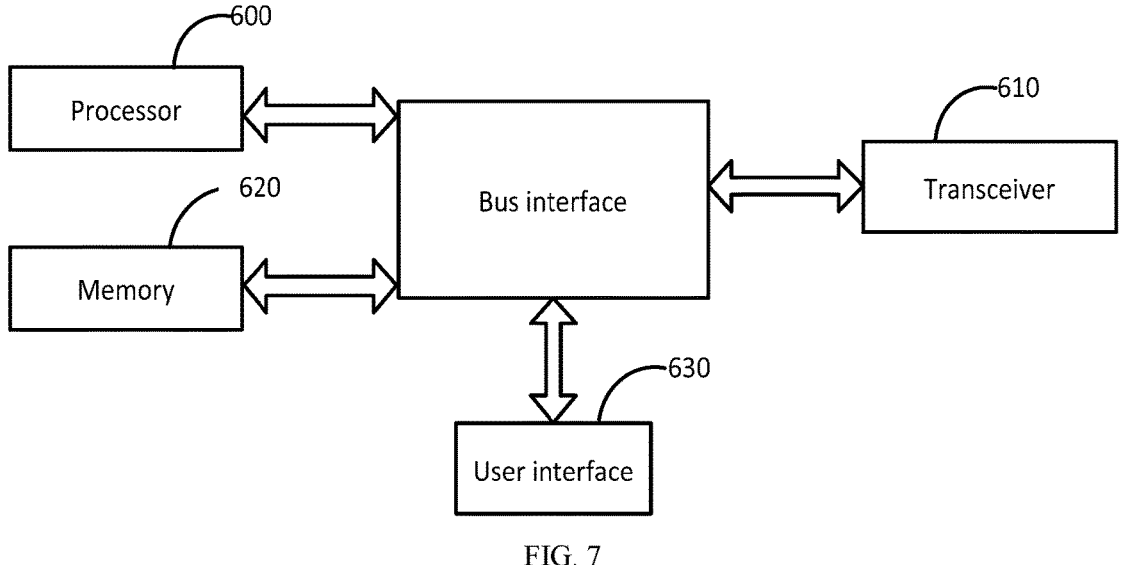
FIG. 7 is a schematic structural diagram of a signal processing apparatus on the terminal side provided by an embodiment of the present application.

When used as a UE, the signal processing apparatus provided by the embodiment of the present application is as shown in FIG. 7. The processor 600 is configured to read the program in the memory 620 and perform the flow of the signal processing method on the transmission terminal or receiving terminal provided by the embodiments of the present application.

A transceiver 610 is configured to receive and transmit the data under the control of the processor 600.

Here, in FIG. 7, the bus architecture may include any numbers of interconnected buses and bridges. In some embodiments, link various circuits of one or more processors represented by the processor 600 and the memory represented by the memory 620. The bus architecture may further link various other circuits such as peripheral device, voltage regulator and power management circuit, which are all well known in the art and thus will not be further described again herein. The bus interface provides an interface. The transceiver 610 may be a number of elements, i.e., include a transmitter and a receiver, and provide the units for communicating with various other devices over the transmission media. For different user equipments, the user interface 630 may also be the interface capable of interconnecting or exter-connecting with the required devices, and the connected devices include but not limited to keypad, display, loudspeaker, microphone, joystick and the like.

The processor 600 is responsible for managing the bus architecture and general processing, and the memory 620 may store the data used by the processor 600 when performing the operations.

In some embodiments, the processor 600 may be Central Processing Unit (CPU), Application Specific Integrated Circuit (ASIC), Field-Programmable Gate Array (FPGA) or Complex Programmable Logic Device (CPLD).

Figure 8:
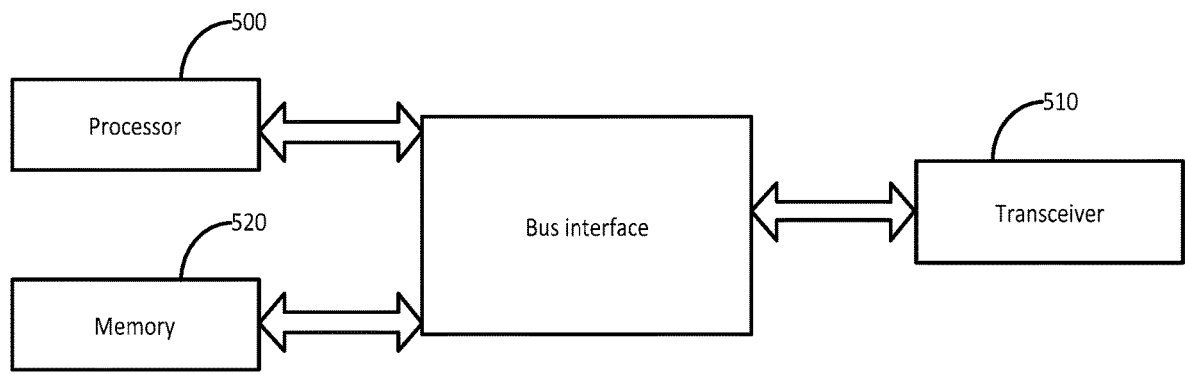
FIG. 8 is a schematic structural diagram of a signal processing apparatus on the base station side provided by an embodiment of the present application.

When used as a base station, the signal processing apparatus provided by the embodiment of the present application is as shown in FIG. 8. The processor 500 is configured to read the program in the memory 520 and perform the flow of the signal processing method on the transmission terminal or receiving terminal provided by the embodiments of the present application.

The transceiver 510 is configured to receive and send the data under the control of the processor 500.

Here, in FIG. 8, the bus architecture may include any numbers of interconnected buses and bridges. In some embodiments, link various circuits of one or more processors represented by the processor 500 and the memory represented by the memory 520. The bus architecture may further link various other circuits such as peripheral device, voltage regulator and power management circuit, which are all well known in the art and thus will not be further described again herein. The bus interface provides an interface. The transceiver 510 may be a number of elements, i.e., include a transmitter and a receiver, and provide the units for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

Figure 9:
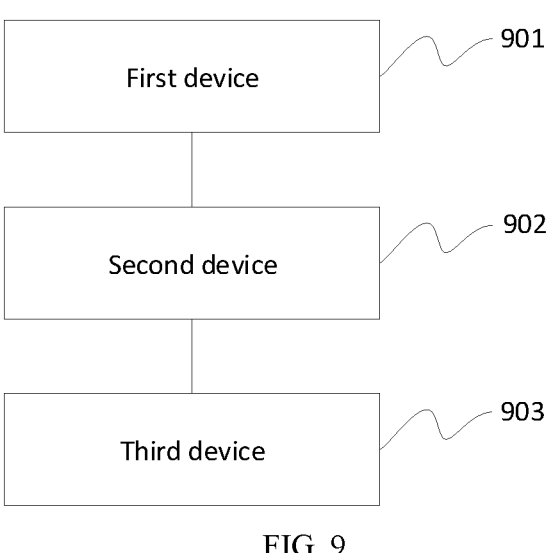
FIG. 9 is a schematic structural diagram of a signal processing apparatus at the receiving terminal provided by an embodiment of the present application.

At the signal receiving terminal, referring to FIG. 9, another signal processing apparatus provided by an embodiment of the present application includes:

a first device 901 configured to perform channel estimation processing based on a received PRS to obtain a frequency domain channel response;

a second device 902 configured to determine a differential value of a relative group delay of a subband based on the frequency domain channel response;

a third device 903 configured to compensate the locally received PRS signal or the frequency domain channel response based on the differential value of the relative group delay of the subband; or report the differential value of the relative group delay of the subband to a transmission terminal that compensates a transmission signal.

Figure 10:
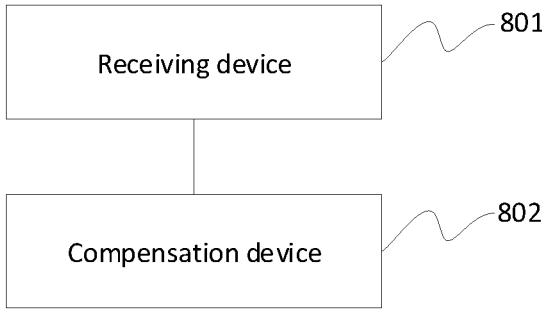
FIG. 10 is a schematic structural diagram of a signal processing apparatus at the transmission terminal provided by an embodiment of the present application.

At the signal transmission terminal, referring to FIG. 10, another signal processing apparatus provided by an embodiment of the present application includes:

a receiving device 801 configured to receive a differential value of a relative group delay of a subband;

a compensation device 802 configured to compensate a transmission signal based on the differential value of the relative group delay of the subband.

Figure 11:
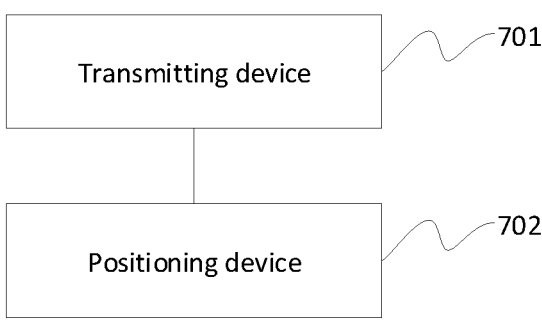
FIG. 11 is a schematic structural diagram of a signal processing apparatus on the LMF side provided by an embodiment of the present application.

On the LMF side, referring to FIG. 11, another signal processing apparatus provided by an embodiment of the present application includes:

a transmitting device 701 configured to send PRS configuration information to a terminal;

a positioning device 702 configured to receive a DL RSTD measurement reported by the terminal, and determine a position of the terminal base on known position information of a base station.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a computer readable storage medium. Based on such understanding, the embodiments of the present application essentially or a part that contributes to the prior art or all or a part of the embodiments in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

Embodiments of the present application provide a computing device, which can be a desktop computer, a portable computer, a smart phone, a tablet computer, a Personal Digital Assistant (PDA) or the like. The computing device can include a Center Processing Unit (CPU), a memory, input/output devices and the like. The input device can include a keyboard, a mouse, a touch screen and the like, and the output device can include a display device such as Liquid Crystal Display (LCD), Cathode Ray Tube (CRT) or the like.

The memory can include a Read-Only Memory (ROM) and a Random Access Memory (RAM), and provide the program instructions and data stored in the memory to the processor. In an embodiment of the present application, the memory may be used to store the program of any one of the methods provided by the embodiments of the present application.

The processor invokes the program instructions stored in the memory and is configured to perform any one of the methods provided by the embodiments of the present application in accordance with the obtained program instructions.

An embodiment of the present application provides a computer storage medium for storing the computer program instructions used by the apparatuses provided by the embodiments of the present application described above, where the computer storage medium contains the program for performing any one of the methods provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by the embodiments of the present application may be applied to the terminal devices, and may also be applied to the network devices.

Here, the terminal device can also refer to as the User Equipment ("UE" for short), Mobile Station ("MS" for short), Mobile Terminal ("MT" for short) or the like. In some embodiments, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like, which is not limited in the embodiments of the present application.

The processing flows of the above methods may be implemented by a software program, which may be stored in a storage medium. When the stored software program is invoked, the above method steps are performed.

The embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Thus the present application is also intended to encompass these modifications and variations therein as long as these modifications and variations to the present application come into the scope of the claims of the present application and their equivalents.

What is claimed is:

1. A signal processing method, comprising:

performing channel estimation processing based on a received Positioning Reference Signal, PRS, to obtain a frequency domain channel response;

determining a differential value of a relative group delay of a subband based on the frequency domain channel response;

compensating a locally received PRS signal or the frequency domain channel response based on the differential value of the relative group delay of the subband; or reporting the differential value of the relative group delay of the subband to a transmission terminal, wherein the differential value of the relative group delay of the subband is adopted to compensate a transmission signal.

2. The method according to claim 1, wherein, in a case that the locally received PRS signal or the frequency domain channel response is compensated, the method further comprises:

performing Time Of Arrival, TOA, measurement based on a compensated PRS signal or a compensated frequency domain channel response, to obtain a TOA measurement and a Downlink Reference Signal Time Difference, DL RSTD, measurement;

wherein the method further comprises:

reporting the DL RSTD measurement to a Location Management Function, LMF, entity.

3. The method according to claim 2, wherein the DL RSTD measurement is a DL RSTD measurement after performing single differential processing on the TOA measurement.

4. The method according to claim 1, wherein the determining the differential value of the relative group delay of the subband based on the frequency domain channel response, further comprises:

determining a reference subband R, and a total delay $\tau_{Total,sub}(R)$ on the reference subband R;

determining a total delay $\tau_{Total,sub}(N)$ on an $N^{th}$ ($N \neq R$) subband;

determining a differential value $\Delta\tau_{delay,sub,diff}(N)$ of a relative group delay on the $N^{th}$ subband based on the total delay $\tau_{Total,sub}(R)$ on the reference subband R and the total delay $\tau_{Total,sub}(N)$ on the $N^{th}$ subband.

5. The method according to claim 4, wherein the total delay $\tau_{Total,sub}(R)$ on the reference subband R is determined by the following formula:

$$\tau_{Total,sub}(R) = phase(H(k_2)*conj(H(k_1)))/(-2\pi(k_2-k_1))$$
$$\Delta f_{scs}) = \tau_{LOS} + \Delta t + \Delta\tau_{delay,sub}(R);$$

wherein $k_2$ and $k_1$ represent any two subcarrier indices on the reference subband R ($k_1 < k_2$), $\Delta f_{scs}$ represents a subcarrier spacing; $H(k_1)$ represents a frequency domain channel response on a $k_1^{th}$ subcarrier, $H(k_2)$ represents a frequency domain channel response on a $k_2^{th}$ subcarrier; $\tau_{LOS}$ represents a transmission delay of a Line Of Sight, LOS, path; $\Delta t$ represents a cumulative sum of clock offsets between the transmission terminal and a receiving terminal; and $\Delta\tau_{delay,sub}(R)$ represents a relative group delay on an $R^{th}$ reference subband;

the total delay $\tau_{Total,sub}(N)$ on the $N^{th}$ subband is determined by the following formula:

$$\tau_{Total,sub}(N) = phase(H(k_4)*conj(H(k_3)))/(-2\pi(k_4-k_3))$$
$$\Delta f_{scs}) = \tau_{LOS} + \Delta t + \Delta\tau_{delay,sub}(N);$$

wherein $k_4$ and $k_3$ represent any two subcarrier indices on the $N^{th}$ subband ($k_3 < k_4$), $H(k_3)$ represents a frequency domain channel response on a $k_3^{th}$ subcarrier, $H(k_4)$ represents a frequency domain channel response on a $k_4^{th}$ subcarrier, and $\Delta\tau_{delay,sub}(N)$ represents the relative group delay on the $N^{th}$ subband;

the differential value $\Delta\tau_{delay,sub,diff}(N)$ of the relative group delay on the $N^{th}$ subband is determined by a following formula:

$$\Delta\tau_{delay,sub,diff}(N) = \tau_{Total,sub}(N) - \tau_{Total,sub}(R) = \Delta\tau_{delay,sub}(N) - \Delta\tau_{delay,sub}(R).$$

6. The method according to claim 5, wherein, in a case that the local received signal or the frequency domain channel response is compensated, the compensated frequency domain channel response H'(k) is obtained by the following formula:

$$H'(k) = H(k)e^{j2\pi*k*\Delta f_{SCS}*\Delta\tau_{delay,sub,diff}\left(floor\left(\frac{k-1}{Q}\right)+1\right)}, k = 1... (M*Q);$$

wherein a system bandwidth is divided into M subbands, each subband contains Q subcarriers, H(k) represents an uncompensated frequency domain channel response, $\Delta f_{scs}$ represents a subcarrier spacing, $$N = floor\left(\frac{k-1}{Q}\right) + 1,$$

and N represents an index value of a subband.

7. The method according to claim 1, wherein the reporting the differential value of the relative group delay of the subband to the transmission terminal, further comprises:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

8. A signal processing method, comprising:

receiving a differential value of a relative group delay of a subband;

compensating a transmission signal based on the differential value of the relative group delay of the subband;

wherein the differential value of the relative group delay of the subband is obtained by a signal receiving terminal based on a received Positioning Reference Signal, PRS, for channel estimation processing, obtaining a frequency domain channel response, and determining the differential value of the relative group delay of the subband based on the frequency domain channel response.

9. The method according to claim 8, wherein the transmission signal in frequency domain is compensated by a following formula:

$$X'(k) = X(K)e^{j2\pi*k*\Delta f_{SCS}\left(\Delta\tau_{delay,sub,diff}\left(floor\left(\frac{k-1}{Q}\right)+1\right)\right)};$$

wherein X(k) represents a data symbol before compensation to be transmitted on a $k^{th}$ subcarrier, X'(k) represents a data symbol after compensation to be transmitted on the $k^{th}$ subcarrier, $\Delta f_{scs}$ represents a subcarrier spacing, $$N = floor\left(\frac{k-1}{Q}\right) + 1, N$$

represents an index value of a subband, and $\Delta\tau_{delay,sub,diff}(N)$ represents a differential value of a relative group delay on an $N^{th}$ subband, wherein k=1 . . . (M*Q), M represents the total number of subbands, Q represents the number of subcarriers contained in each subband, and M*Q represents the total number of subcarriers.

10. The method according to claim 9, further comprising:
mapping a compensated transmission signal X'(k) to the $k^{th}$ subcarrier for transmission.

11. A signal processing method, comprising:
transmitting Positioning Reference Signal, PRS, configuration information to a terminal, wherein the PRS configuration information is configured for the terminal to receive a PRS based on the PRS configuration information, perform channel estimation processing based on a received PRS to obtain a frequency domain channel response, determine a differential value of a relative group delay of a subband based on the frequency domain channel response, compensate a locally received PRS signal or the frequency domain channel response based on the differential value of the relative group delay of the subband; or report the differential value of the relative group delay of the subband to a transmission terminal, wherein the differential value of the relative group delay of the subband is adopted to compensate a transmission signal;
receiving a Downlink Reference Signal Time Difference, DL RSTD, measurement reported by the terminal, and determining a position of the terminal base on known position information of base stations.

12. The method according to claim 11, wherein the PRS configuration information comprises at least one of:
a frequency domain location of a same Component Carrier, CC, or frequency domain locations of different CCs;
time domain location information of PRS;
frequency domain location information of PRS; or
a notification that a transmission terminal or receiving terminal compensates a transmitted signal.

13. A signal processing apparatus, comprising:
a memory configured to store program instructions;
a processor configured to invoke the program instructions stored in the memory and execute the method of claim 1.

14. The apparatus according to claim 13, wherein, in a case that the locally received PRS signal or the frequency domain channel response is compensated, the processor is further configured to:

perform Time Of Arrival, TOA, measurement based on a compensated PRS signal or a compensated frequency domain channel response, to obtain a TOA measurement and a Downlink Reference Signal Time Difference, DL RSTD, measurement;
wherein the processor is further configured to: report the DL RSTD measurement to a Location Management Function, LMF, entity;
wherein the DL RSTD measurement is a DL RSTD measurement after performing single differential processing on the TOA measurement.

15. The apparatus according to claim 13, wherein the determining the differential value of the relative group delay of the subband based on the frequency domain channel response, further comprises:
determining a reference subband R, and a total delay $\tau_{Total,sub}(R)$ on the reference subband R;
determining a total delay $\tau_{Total,sub}(N)$ on an $N^{th}$ (N≠R) subband;
determining a differential value $\Delta\tau_{delay,sub,diff}(N)$ of a relative group delay on the $N^{th}$ subband based on the total delay $\tau_{Total,sub}(R)$ on the reference subband R and the total delay $\tau_{Total,sub}(N)$ on the $N^{th}$ subband.

16. The apparatus according to claim 15, wherein the total delay $\tau_{Total,sub}(R)$ on the reference subband R is determined by a following formula:

$$\tau_{Total,sub}(R)=phase(H(k_2)*conj(H(k_1)))/(-2\pi(k_2-k_1)$$
$$\Delta f_{scs})=\tau_{LOS}+\Delta t+\Delta\tau_{delay,sub}(R);$$

wherein $k_2$ and $k_1$ represent any two subcarrier indices on the reference subband R ($k_1<k_2$), $\Delta f_{scs}$ represents a subcarrier spacing; $H(k_1)$ represents a frequency domain channel response on a $k_1^{th}$ subcarrier, $H(k_2)$ represents a frequency domain channel response on a $k_2^{th}$ subcarrier; $\tau_{LOS}$ represents a transmission delay of a Line Of Sight, LOS, path; $\Delta t$ represents a cumulative sum of clock offsets between the transmission terminal and a receiving terminal; and $\Delta\tau_{delay,sub}(R)$ represents a relative group delay on an $R^{th}$ reference subband;
the total delay $\tau_{Total,sub}(N)$ on the $N^{th}$ subband is determined by the following formula:

$$\tau_{Total,sub}(N)=phase(H(k_4)*conj(H(k_3)))/(-2\pi(k_4-k_3)$$
$$\Delta f_{scs})=\tau_{LOS}+\Delta t+\Delta\tau_{delay,sub}(N);$$

wherein $k_4$ and $k_3$ represent any two subcarrier indices on the $N^{th}$ subband ($k_3<k_4$), $H(k_3)$ represents a frequency domain channel response on a $k_3^{th}$ subcarrier, $H(k_4)$ represents a frequency domain channel response on a $k_4^{th}$ subcarrier, and $\Delta\tau_{delay,sub}(N)$ represents the relative group delay on the $N^{th}$ subband;
the differential value $\Delta\tau_{delay,sub,diff}(N)$ of the relative group delay on the $N^{th}$ subband is determined by a following formula:

$$\Delta\tau_{delay,sub,diff}(N)=\tau_{Total,sub}(N)-\tau_{Total,sub}(R)=\Delta\tau_{delay,sub}$$
$$(N)-\Delta\tau_{delay,sub}(R).$$

17. The apparatus according to claim 16, wherein, in a case that compensating the local received signal or the frequency domain channel response, the processor obtains the compensated frequency domain channel response H'(k) by a following formula:

$$H'(k) = H(k)e^{j2\pi*k*\Delta f_{SCS}*\Delta\tau_{delay,sub,diff}\left(floor\left(\frac{k-1}{Q}\right)+1\right)}, k = 1... (M*Q);$$

wherein a system bandwidth is divided into M subbands, each subband contains Q subcarriers, H(k) represents an uncompensated frequency domain channel response, $\Delta f_{scs}$ represents a subcarrier spacing, $$N = \text{floor}\left(\frac{k-1}{Q}\right) + 1,$$

and N represents an index value of a subband.

18. The apparatus according to claim 13, wherein the reporting the differential value of the relative group delay of the subband to the transmission terminal, further comprises:

quantifying and then reporting the differential value of the relative group delay of the subband; or quantifying the differential value of the relative group delay of the subband, and reporting a compensation index value corresponding to a quantized differential value of the relative group delay according to a preset quantization compensation table.

19. A signal processing apparatus, comprising:

a memory configured to store program instructions;

a processor configured to invoke the program instructions stored in the memory and execute the method of claim 8.

20. A signal processing apparatus, comprising:

a memory configured to store program instructions;

a processor configured to invoke the program instructions stored in the memory and execute the method of claim 11.

\* \* \* \* \*